UNITED STATES PATENT OFFICE.

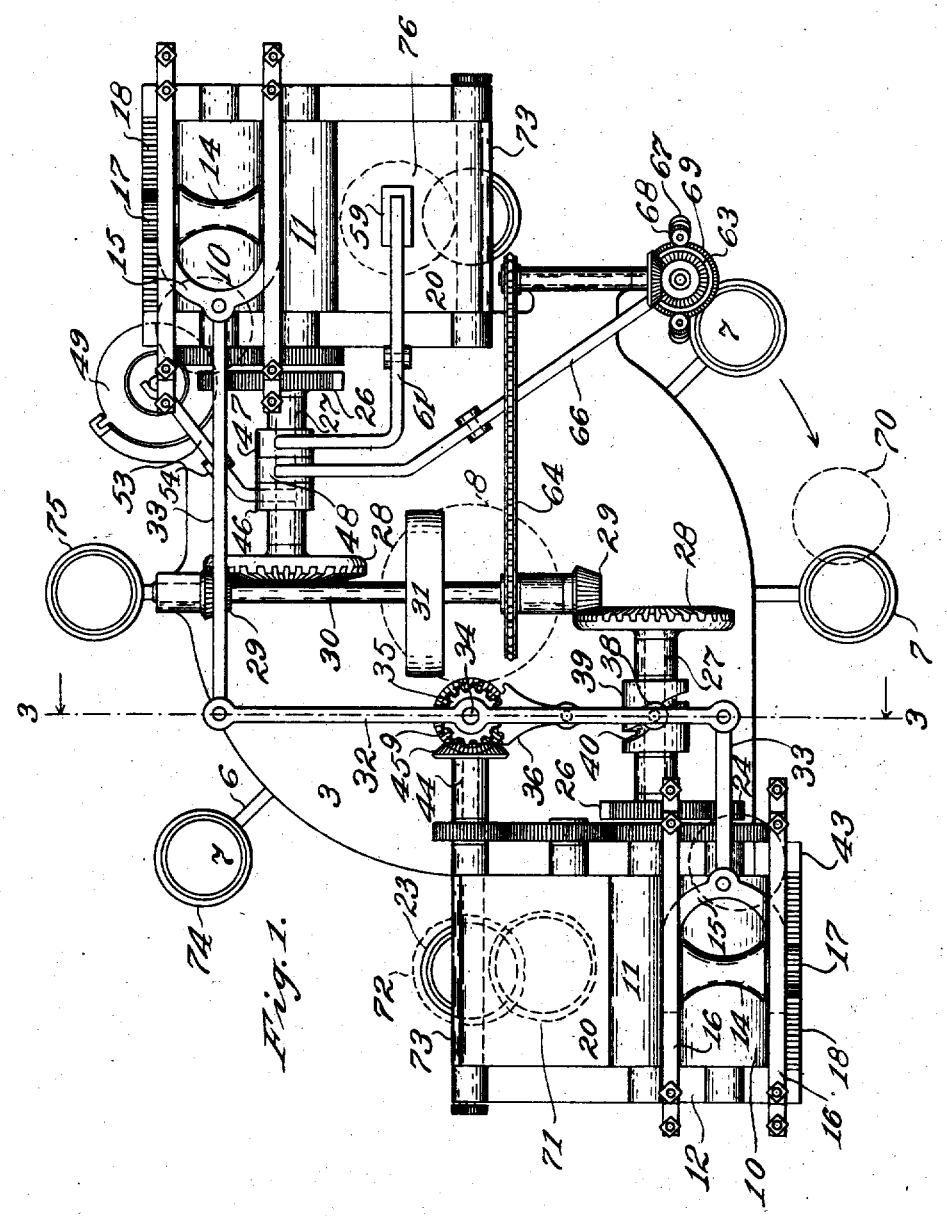

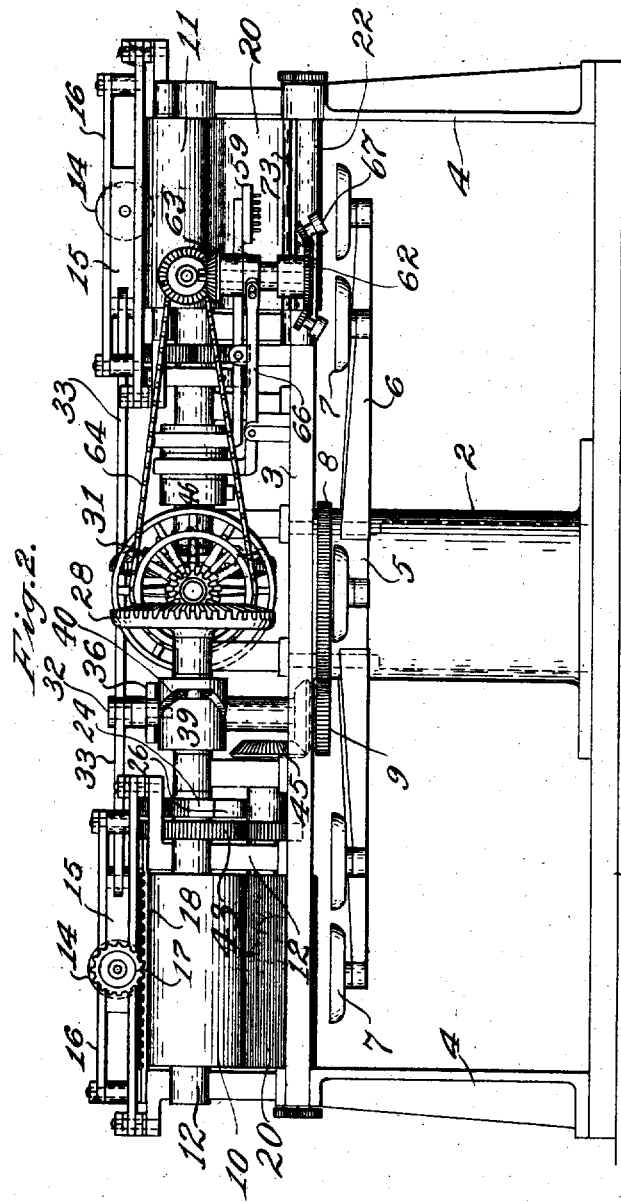

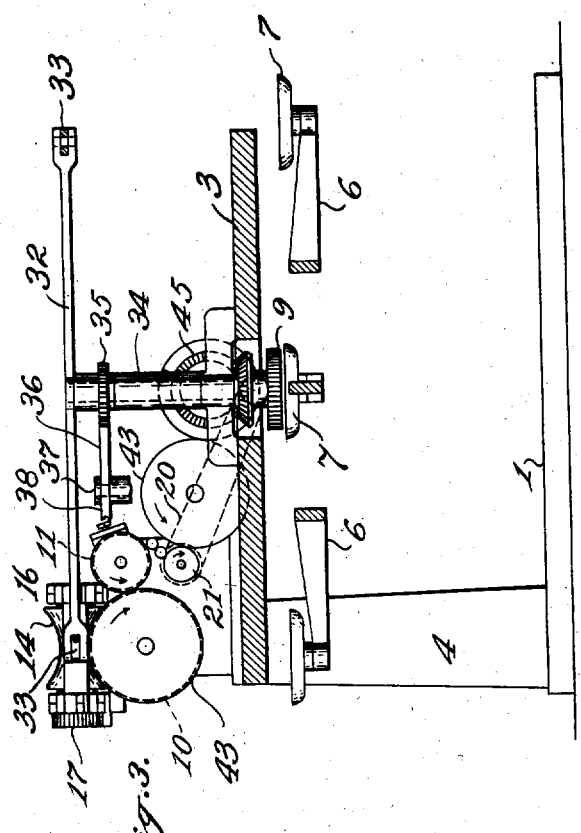

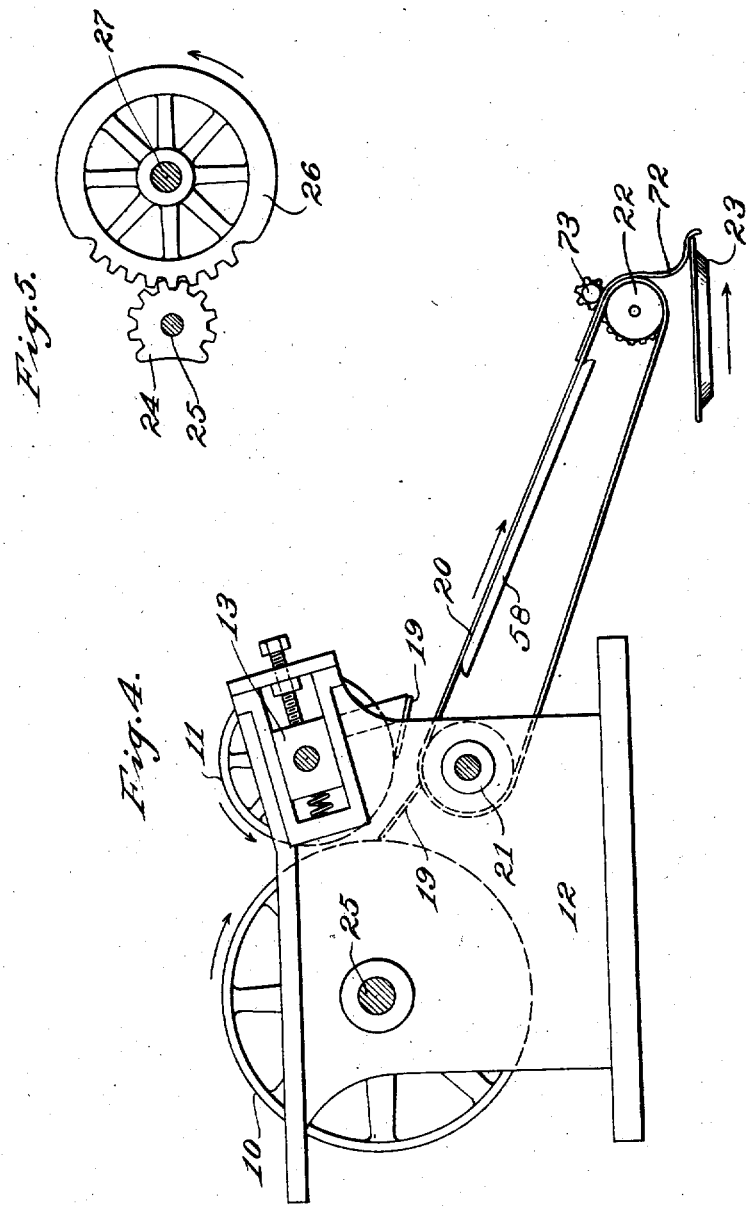

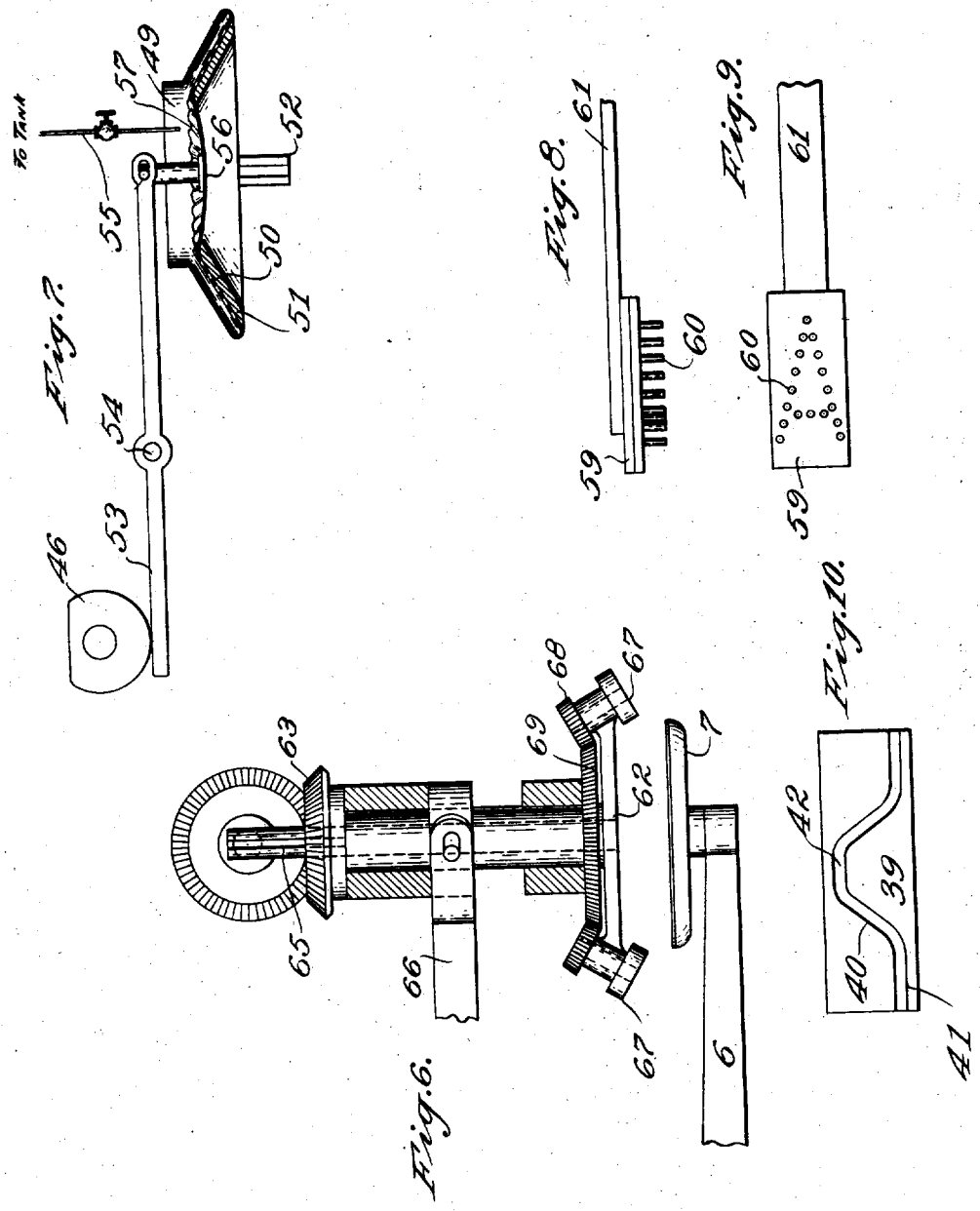

FRED DEUERLING, OF CHICAGO, ILLINOIS.

PIE-MACHINE.

No. 857,609.

Specification of Letters Patent.

Patented June 25, 1907.

Application filed February 6, 1907. Serial No. 356,049.

*To all whom it may concern:*

Be it known that I, FRED DEUERLING, a citizen of the United States of America, and a resident of Chicago, in the county of Cook and State of Illinois, have invented certain new and useful Improvements in Pie-Machines, of which the following is a specification.

The main object of this invention is to provide an improved form of pie machine adapted to rapidly make pies, automatically performing the successive operations of shaping a pie crust, placing it upon the pie plate, delivering the same to a position where it is filled, moistening the edges of the lower crust, forming a second crust, marking said second crust to indicate the contents of the pie, delivering the same upon the filled pie, and finally trimming off the surplus crust.

Further objects are to provide an improved form of pie crust rolling mechanism; to provide improved means for automatically depositing rolled sheets of dough successively upon a series of pie tins; to provide improved means for moistening the edges of the lower pie crust preparatory to having the upper crust placed thereon; to provide improved means for marking the upper crust during its delivery to the pie tins; and to provide an improved general arrangement of the mechanism of a device of this class so that the pie tins are conveniently accessible at all points of their path along the conveyer and so that the mechanism is compactly arranged and so located as to offer a minimum obstruction to the operations of the operators.

These objects are accomplished by the device shown in the accompanying drawings, in which:

Figure 1 is a top plan of a pie machine constructed according to this invention. Fig. 2 is a front elevation of the same. Fig. 3 is a section on the line 3—3 of Fig. 1, showing the arrangement of the mechanism which operates one set of the crust rollers. Fig. 4 is an enlarged detail of the crust rollers showing more clearly the relative adjustment of the various rollers and their relation to the delivery belt which deposits the crusts upon the pie tins. One of the pie tins is indicated below the belt to illustrate the method of laying the pie crust upon it. Fig. 5 is a detail of the mutilated gearings which intermittently operate the crust rollers and feed belt. Fig. 6 is a detail of a pie crust trimming device suitable for use in this machine. Fig. 7 is a detail, partly in section, of the fountain moistener by which the edges of the lower crust are moistened to insure proper adhesion of the upper crust. Fig. 8 is a detail in elevation of the marking die which stamps the upper pie crust. Fig. 9 is a bottom plan of the same. Fig. 10 is a development of the face of the cam which controls the operation of the upper crust rollers.

In the construction shown in the drawings, the supporting frame comprises a bed plate 1 having a central pillar 2 which carries a table 3 upon which are mounted the mechanisms which operate upon the pie tins. The crust rolling devices are supported upon the wings of the table 3 which extend toward opposite sides thereof and which are supported by uprights 4.

The conveyer, which carries the pie tins to the different mechanisms which perform the successive operations, comprises a hub 5 which is journaled upon the pillar 2 below the table 3, and is provided with a plurality of rotating arms 6 each having at its end a support 7 adapted to hold a pie tin in a substantially horizontal position. The arms 6 are equally spaced and the supports 7 are all in the same horizontal plane. The hub 5 is rotated by means of a gear 8 which is rigidly connected therewith and which meshes with a pinion 9, whose connection with the driving mechanism will be hereinafter described.

There are two crust rolling mechanisms, one for forming each crust. These are substantially alike and each comprises a pair of rollers 10 and 11 journaled on parallel horizontal axes in a frame 12 which is mounted upon the wing of the table 3. The roller 11 is preferably mounted in adjustable bearings 13 so that it may be shifted toward and away from the roller 10 for regulating the thickness of the pie crust. The rollers 10 and 11 are geared together so as to run at the same peripheral speeds. As the necessary relative adjustment of said rollers is comparatively slight, said rollers may be directly geared together, the gear teeth being of sufficient length to admit of such adjustment. A third roller 14 is journaled in a cross-head 15 above the roller 10 and on an axis which is at right angles to that of the roller 10. The cross-head is mounted in guides 16 which are adjustable vertically with respect to the supporting frame so as to adjust the space between the rollers 10 and 14. The roller 14 is of spool-shape, its surface being concave toward the roller 10 to conform with the curvature of the periphery of said roller. A pinion 17 rigid on the shaft of the roller 14 meshes with a rack 18 and insures that the movement of the cross-head 15 will cause a purely rolling relation between the rollers 14 and 10.

Scrapers 19 are provided so as to free the dough from the rollers 10 and 11, the lower scraper 19 serving as a guide for directing the crust toward the delivery apron 20. This apron consists of an endless belt carried by rollers 21 and 22. The upper part of the belt 20, though inclined, is sufficiently near to a horizontal position that the sheet of dough will rest thereon without sliding. The roller 22 at its delivery end should be as near as possible to the path of the pie tins on the conveyer. One of said pie tins is indicated at 23 in Fig. 4.

The rollers 10 and 11 are intermittently driven by means of a mutilated pinion 24 which is rigid on the shaft 25 of the roller 10. These mutilated gears are so arranged that the roller 10 will rotate intermittently through the continuous rotation of the gear 26. The shaft 27 which carries the gear 26 also has rigidly mounted thereon a bevel gear 28 which is driven by a pinion 29 carried by the main driving shaft 30. Power is applied to the driving shaft 30 by a belt mounted on the pulley 31 and said shaft is continuously driven during the operation of the machine.

The cross-heads 15 of the two crust rolling devices are connected together by means of a lever 32 and links 33. The lever 32 is mounted to oscillate on a fixed shaft 34 which is located at the middle of said lever 32. The lever 32 is oscillated by means of a pinion 35 which meshes with a sector 36 pivoted on the frame at 37. The sector 36 has an arm 38 which engages a cam 39 on one of the shafts 27. The peripheral groove 40 in the cam 39 is of such form that it will cause the roller 14 to move from one end of the roller 10 to the other during the interval of time when said roller 10 is at rest, then hold the roller 14 stationary for a time after the roller 10 has commenced to rotate, and finally return the roller 14 to its initial position during the latter portion of the rotation of the roller 10. This will be seen from Fig. 10 which represents a development of the surface of the cam. The portions 41 and 42 of the groove 40 indicate the intervals during which the roller 14 is at rest at the respective ends of the roller 10.

The roller 21 is geared to the roller 11 and is driven at a slightly greater peripheral speed than that of the rollers 10 and 11. The train of gears 43 connecting the rollers 10, 11, and 21 is extended by additional gears so as to drive a shaft 44, which is connected by miter gears 45 with the pinion 9 as will be seen in Figs. 1 and 2. As the pinion 9 drives the conveyer, said mechanism will cause the conveyer to operate only during the intervals of operation of the crust rolling devices. The gearing connecting said crust rolling devices and conveyer should preferably be proportioned so as to drive the conveyer at substantially the same speed as the belt 20, thus insuring that the pie crusts are laid upon the pie tins without any drag so as to insure their proper registry with the pie tins. The train of gears for operating the conveyers need of course be connected with only one of the crust rolling devices, as in Fig. 1.

Upon the shaft 27 of the second crust rolling device are three cams 46, 47, and 48, which respectively control the operation of the moistener, the stamper, and the trimmer, which will be hereinafter described.

The device which moistens the lower crust to cause the two crusts of the pie to stick together after the same is filled, is shown in Fig. 7. This device consists of a tank 49 having a downwardly concave conical bottom 50 which is covered by a layer of absorbent material 51 such as felt or lamp wicking suitably located to engage the pie crust near its edges when the tank is lowered. The tank 49 is mounted to slide in vertical guides 52 and is normally urged to descend by gravity. The tank 49 is lifted by means of a lever 53 which is pivoted at 54 on the supporting frame and has an arm engaging the cam 46. The bottom 50 of the tank 49 is perforated and water is supplied from a pipe 55 provided with a valve so as to control the rate of flow of the water. The middle part 56 of the bottom of the tank is preferably dished at its middle part and corrugated at the edges 57 of the dished part so that the water will overflow evenly toward all sides.

The upper part of the delivery belt 20 of the crust roller which rolls the upper crusts of the pies is supported by a guide plate 58 shown in Fig. 4. This gives support to the belt to prevent it from yielding during the stamping operation. The stamping die consists of a pad 59 having thereon a plurality of blades or pins 60 adapted to cut a mark or character in the pie crust to indicate its contents. The pad 59 is carried by a lever 61 which is pivotally mounted on the supporting frame and controlled in its operation by the cam 47. This cam is so shaped that in operation, the stamper impresses the sheet of dough and is then instantly drawn away so as to prevent the dough from sticking to the die.

The trimming device is illustrated in Fig. 6 and consists of a rotating head 62 which is driven by bevel gears 63 connected with the main driving shaft 30 by means of a link belt 64. One of the miter gears 63 is splined to the shaft 65 of the head 62 and said shaft is vertically movable in its bearings. The position of the head 62 is controlled by the lever 66 which is in turn controlled by the cam 48. The head 62 carries the usual trimming rollers 67 which are rotated through the rotation of the head 62 by means of the bevel pinion 68 meshing with a stationary bevel gear 69. In operation, the head 62 is pressed down by the lever 66 so as to carry the trimming roller 67 into contact with the edges of the pie tin about which they roll, cutting off the superfluous dough.

The operation of the device shown is as follows: In the form shown in the drawings, the various mechanisms operate intermittently and the conveyer rotates so as to bring each pie tin in succession to each of the different mechanisms which operate upon it. The operation of the device will therefore be described in the order in which the different operations are performed upon each pie tin. In Fig. 1, the arms of the conveyer are shown in positions corresponding to the position of the pie tin shown in Fig. 4, the conveyer being assumed to be in motion. When the conveyer is at rest, a pie tin or plate is placed upon the carrier which is in the position indicated by the dotted circle 70. This is also the position at which the tins are removed. The same operator performs both operations. The cross-heads 15 will be in their initial positions at one of the limits of their movement, while the conveyer is at rest. The operator places a piece of dough large enough to form the lower crust of a pie in front of the roller 14; said roller then travels toward the opposite end of the roller 10 and flattens out the dough against the periphery of the roller 10. This operation elongates the piece of dough in the direction of the axis of the roller 10, but leaves it considerably thicker than the finished crust. After the roller 14 has passed clear of the dough on the roller 10, the mutilated gears 24 and 26 start the rotation of the rollers 10 and 11. This carries the dough between the rollers 10 and 11 and elongates the dough in a direction at right angles to the first elongation. The scraper 19 guides the dough toward the belt 20. The space between the rollers 10 and 11 determines the final thickness of the sheet of dough. During the rotation of the rollers 10 and 11, the connecting train of gears causes the belt 20 to travel so as to carry the dough to approximately the position indicated at 71 in Fig. 1. The belt 20 stops with the crust in this position when the conveyer comes to its position of rest. The succeeding operation of this crust roller carries the sheet of dough beyond this position and discharges it in a downward direction into the path of the adjacent pie tin 23. A roller 73, located at the delivery end of the belt 20 and geared to the roller 22, prevents the pie crust 27 from slipping off from the belt 20 and falling before the pie tin is in proper position to receive it.

The advancing edge of the sheet of dough 73 is fed to a position so that the sheet is engaged by the advancing edge of the pie tin 23 as shown in Fig. 4. The speed of the belt 20 is such as to properly lay the pie crust 72 upon the tin while said tin is moving past the delivery end of the belt 20. During the operation of depositing one crust upon a pie tin, a second crust will have been rolled out and carried to the position 71 when the belt 20 again comes to rest. After the pie tin has received the bottom crust, it passes the positions 74 and 75 at which points the filling of the pie is placed upon the lower crust. The next operation of the conveyer carries the pie to a position directly below the moistener. Here, during the period when the conveyer is at rest, the cam 46 depresses the moistener for an instant and deposits a film of moisture around the edge of the pie crust. The pie tin next passes into position for receiving its upper crust. When this crust has been rolled and is at rest in the position 76 on the corresponding belt 20, the cam 47 causes the stamper to impress the mark upon the pie crust and said crust is then deposited upon the tin at the next operation of the conveyer. The tin next comes to rest in a position directly below the trimmer which during the interval of rest is forced down to bring the trimming rollers into contact with the edges of the tin and trims off the superfluous crust which overhangs said edges. This crust falls into a suitable receptacle located at this point for receiving the trimmings. The pie tin is next carried to the position 70 where the completed pie is removed and a new tin placed upon the support 7.

What I claim as my invention and desire to secure by Letters Patent is:

1. The combination of a pair of opposed rollers adapted to elongate a mass of plastic material passed between, and a third roller co-acting with one of the rollers of said pair and adapted to elongate the material in a direction transverse to the elongation effected by said first pair of rollers.

2. The combination of a pair of opposed rollers adapted to elongate a mass of plastic material passed between, a third roller journaled on an axis transverse to that of one of the rollers of said pair and adapted to travel along such roller in a longitudinal direction to elongate the material in a direction transverse to the elongation effected by said first pair of rollers.

3. The combination of a pair of opposed rollers, mechanism for driving said rollers intermittently, a third roller journaled on an axis at right angles to one of the rollers of said pair and co-acting therewith, mechanism for causing said third roller to travel across the surface of said one roller for elongating a mass of plastic material between them, said mechanisms being arranged to operate alternately and adapted to successively roll the material in different directions to form thin sheets.

4. The combination of a pair of opposed horizontally disposed rollers adapted to elongate a mass of plastic material passed between, a third roller disposed at right angles to one of the rollers of said pair and having its periphery concave toward said one roller, said third roller being adapted to roll along the surface of said one roller in a longitudinal direction for rolling out a mass of plastic material upon the surface of said one roller, and mechanism for operating said third roller in advance of the operation of said pair of rollers for rolling the material into sheets.

5. The combination of a conveyer adapted to carry a series of pie tins, a pie crust rolling machine located adjacent to the path of said conveyer, and delivery mechanism for conveying pie crusts from said crust rolling machine to said conveyer and adapted to automatically discharge a pie crust upon each of said tins when such tin arrives at a certain position along the path of said conveyer.

6. The combination of a conveyer adapted to support and carry along in succession a series of pie tins, a horizontally disposed endless apron extending along and above a part of the path of said conveyer and adapted to carry sheets of dough and deliver the same edgewise downwardly toward the path of said conveyer, rolling mechanism adapted to roll a mass of dough into a thin sheet and deposit the same upon said apron, and mechanism for controlling the successive operations of said rolling mechanisms so as to deliver sheets of dough to said apron at suitable intervals for depositing one of such sheets upon each pie tin when the same arrives at the delivery end of said apron.

7. The combination of a conveyer adapted to support a pie tin in a substantially horizontal position and carry the same along, a horizontally disposed endless apron adapted to support a sheet of dough on its upper surface and deliver the same downwardly into the path of the pie tin on said conveyer, and a roller having its periphery opposed to that of said apron near the delivery end thereof and adapted to engage the sheet of dough on said apron and prevent the same from slipping off when depending therefrom.

8. The combination of a conveyer adapted to support a pie tin in a substantially horizontal position and carry the same along, a horizontally disposed endless apron adapted to support a sheet of dough on its upper surface and deliver the same downwardly into the path of the pie tin on said conveyer, and a guide at the delivery end of said apron adapted to prevent the dough from slipping off from said apron while depending therefrom.

9. The combination of feeding means adapted to carry along a series of horizontally disposed pie tins, an endless apron extending along and above the path of the tins and adapted to support sheets of dough and deliver the same edgewise in a downward direction toward the path of said tins, a pair of opposed rollers adapted to roll a sheet of dough and deliver the same upon said apron, mechanism for operating said rollers intermittently; a third roller mounted above one of the rollers of said pair, being journaled on an axis at right angles to the axis of said roller and mounted to roll along said one roller in a longitudinal direction for flattening out a mass of dough supported by said roller, said third roller being arranged to operate during intervals when said pair of rollers is at rest, and said rollers being driven to operate at suitable intervals for supplying sheets of dough to said apron at proper intervals to register with the tins on said conveyer.

10. A machine for rolling plastic material into thin sheets, comprising a supporting surface intermittently movable in one direction for carrying the material along, a roller journaled in movable bearings and adapted to travel across said surface in a direction transverse to the movement of said surface, a second roller having its periphery opposed to said surface and co-acting therewith, and mechanism for intermittently and alternately moving said surface and said first roller.

11. A machine for rolling plastic material into thin sheets, comprising a supporting surface intermittently movable in one direction for carrying the material along, a roller journaled in movable bearings and adapted to travel across said surface in a direction transverse to the movement of said surface, a second roller journaled in stationary bearings and adapted to operate upon said material when said surface moves along, means intermittently and alternately moving said first roller and said surface.

12. A pie machine comprising a conveyer adapted to carry pie tins in succession along a horizontal path, a pair of crust rolling mechanisms adapted to deliver pie crusts to the pie tins on said conveyer at different points along said path, means adapted to moisten the edges of a crust after the same has been deposited by the first of said crust rolling devices, and means co-operating with said second crust rolling device and adapted to impress a mark upon each crust during its passage from said second crust rolling means to said tins, all being arranged to operate intermittently and being timed so as to operate successively upon each pie tin carried by said conveyer.

13. In a pie machine, the combination of a support for a pie tin, a moistener mounted above said support and movable toward and away from said support for moistening the edges of a pie crust on a tin supported thereon, said moistener comprising an annular pad of absorbent material, and a fountain for supplying moisture for said pad.

14. The combination of a conveyer adapted to support and carry along a series of pie tins, a moistener comprising an annular pad located above the path of the tins on said conveyer, said conveyer being intermittently movable for bringing the pie tins in succession to a position below said moistener, mechanism for automatically depressing said moistener during intervals when said conveyer is at rest, and means for uniformly moistening the surface of said pad.

15. In a pie machine, a moistener comprising a horizontally disposed annular pad of absorbent material, and a fountain adapted to distribute moisture uniformly over the surface of said pad.

16. In a pie machine, a moistener comprising a tank having an annular perforated area in its bottom, a pad of absorbent material mounted on said tank below said perforated area, and means for feeding water into said tank.

17. In a pie machine, a moistener comprising a tank having a downwardly concave annular perforated bottom, and an annular pad of absorbent material mounted upon and below said bottom and adapted to receive moisture through said perforations.

18. In a pie machine, a moistener comprising a tank having its bottom dished at the middle part and having a downwardly and outwardly inclined perforated annular area surrounding the dished part, an annular pad of absorbent material secured below said perforated area and adapted to soak up liquid overflowing the edges of said dished part.

19. In a pie machine, a crust moistener comprising a plate having a central area with level edges and adapted to overflow uniformly at all sides, a pipe for feeding liquid to said central area, said plate having a downwardly and outwardly inclined annular perforated area surrounding said central area, and an annular pad of absorbent material secured below said perforated area and adapted to soak up liquid passing through said perforated area.

20. In a pie machine, a crust moistener comprising a plate having a central area with level corrugated edges, and adapted to overflow uniformly at all sides, a pipe for feeding liquid to said central area, said plate having a downwardly and outwardly inclined annular perforated area surrounding said central area, and an annular pad of absorbent material secured below said perforated area and adapted to soak up liquid passing through said perforated area.

Signed at Chicago this 4th day of February 1907.

FRED DEUERLING.

Witnesses:
L. A. SMITH,
E. A. RUMMLER.